BOB N. NAYDAN
MARIO VOJVODICH
*INVENTORS*

BY George B. Oujevolk
ATTORNEY

BOB N. NAYDAN
MARIO VOJVODICH
*INVENTORS*

BY George B. Oujevolk
ATTORNEY

Oct. 4, 1966 B. N. NAYDAN ETAL 3,277,464

DIGITAL TO SYNCHRO CONVERTER

Filed Dec. 19, 1963 11 Sheets-Sheet 3

BOB N. NAYDAN
MARIO VOJVODICH
INVENTORS

BY George B. Oujevolk

ATTORNEY

Oct. 4, 1966 B. N. NAYDAN ETAL 3,277,464

DIGITAL TO SYNCHRO CONVERTER

Filed Dec. 19, 1963

11 Sheets-Sheet 4

ERROR ALLOWED FOR SINE OR COSINE NETWORKS VERSUS INPUT ANGLE ASSUMING $M_1$ OR $M_2 = 0$

BOB N. NAYDAN
MARIO VOJVODICH
*INVENTORS*

BY George B. Oujevolk

ATTORNEY

BOB N NAYDAN
MARIO VOJVODICH
INVENTORS

BY George B. Oujevolk
ATTORNEY

BOB N. NAYDAN
MARIO VOJVODICH
*INVENTORS*

BY George B. Oujevolk

ATTORNEY

Oct. 4, 1966 B. N. NAYDAN ETAL 3,277,464

DIGITAL TO SYNCHRO CONVERTER

Filed Dec. 19, 1963 11 Sheets-Sheet 7

BOB N. NAYDAN
MARIO VOJVODICH
*INVENTORS*

BY George B. Oujevolk

ATTORNEY

BOB N. NAYDAN
MARIO VOJVODICH
*INVENTORS*

BY George B. Oujevolk

ATTORNEY

DIGITAL TO SYNCHRO CONVERTER

BOB N. NAYDAN
MARIO VOJVODICH
*INVENTORS*

BY George B. Oujevolk
ATTORNEY

BOB N. NAYDAN
MARIO VOJVODICH
*INVENTORS*

BY George B. Oujevolk
ATTORNEY

BOB N. NAYDAN
MARIO VOJVODICH
*INVENTORS*

BY George B. Oujevolk

ATTORNEY

United States Patent Office 3,277,464
Patented Oct. 4, 1966

3,277,464
DIGITAL TO SYNCHRO CONVERTER

Bob N. Naydan, Oakland, and Mario Vojvodich, North Bergen, N.J., assignors to General Precision Inc., Little Falls, N.J., a corporation of Delaware Filed Dec. 19, 1963, Ser. No. 331,659
8 Claims. (Cl. 340—347)

The present invention relates to the creation of trigonometric functions and more particularly to the creation of an analog output supplied in a computer such as a sine or cosine when the input is an angle value.

For many purposes, in present-day use, the input supplied to a computer relates to an angle value. Thus, in navigation, the first value obtained is usually an angle. From the angle, the navigator then looks through his book of tables and obtains the sine and cosine required. The sines and cosines thus obtained can be fed to computers for processing. In numerous cases however where the angle is rapidly changing such as in space navigation, the angle is obtained by mechanical or other means and it is essential to convert the angle value so obtained to sinusoidal value. Heretofore, an electro-mechanical method was used to carry out this conversion. The digital angular value was converted to a binary ladder value. The binary ladder value was then converted into an analog voltage. The voltage was then fed into a servo-amplifier which was used to drive a motor turning a potentiometer to a position where the voltage obtained from the wiper arm of the potentiometer was equal to the input voltage to the servo-amplifier. The position of the potentiometer was then proportional to the input angle. A synchro which was geared to the potentiometer was then positioned to the angle. This device suffered from the defect that the mechanical components had a relatively short life. The accuracy deteriorated with use, and depended largely on the gearing. Also, because of the physical turning of the synchro by mechanical gears, the conversion time was slow and the angle was limited by the potentiometer rotation of less than 360°. As a sinusoidal function corresponding to an angle does not vary linearly with the angle, the conversion of an angular value into a sinusoidal function is not readily achieved.

The present invention therefore relates to a system whereby a sinusoidal output will be supplied readily and rapidly as the result of a digital value corresponding to an angle. In the George Schroeder et al. U.S. Patent No. 3,071,324, entitled "Synchro to Digital Converter," it has been shown that a sinusoidal value can be converted to a digital angle value. The present application is concerned with the reverse of the problem solved in the Schroeder et al. patent, namely, the conversion of a digital angular value into a corresponding sinusoidal value. Since the present patent application is written in the light of the teachings of the Schroeder et al. patent, a knowledge of the fundamental philosophy used in the Schroeder et al. patent application is extremely useful in understanding the present invention.

Thus, an object of the present invention is to provide the sine or cosine of an angle from a digital value corresponding to the angle.

Another object of the present invention is to provide an arrangement which will simulate the output of a synchro or resolver without using a synchro or resolver.

Generally speaking, the present invention contemplates an arrangement to convert a digital binary input corresponding to an angle into a sinusoidal function corresponding to the angle. The binary input is first fed to logic means which will determine the particular quadrant of the angle. Coupled to the logic means is a register including a plurality of flip-flops therein. These flip-flops will be separately actuated to their flip or flop position depending on the binary signal fed to the logic means. Responsive to signals from the register is a parallel base resistor network which has a parallel ladder of base binary resistors to supply base sinusoidal values in response to flip-flop signals from the register. Acting in conjunction with the base resistor network is a correction network of parallel resistors and gating circuits. The gating circuits control which one of the correction resistors are in the network in response to inputs from the register. These correction resistors adjust the sinusoidal value supplied by the base resistor network to the true sinusoidal value when more than one base resistor is in the network. To supply fine values between succeeding base values and binary combinations thereof, a fine resistor network is provided also responsive to the register. To apportion the fine values supplied by the fine resistors between values supplied by succeeding base resistors and binary combinations thereof, there is an attenuation network and a plurality of gating circuits which determine which of the attenuation resistors are in the circuit in response to inputs from the register. The attenuation resistors supply the correct slope of the approximated function while the fine resistors provide values along the slope. Depending on the quadrant, the current phase may be in the one or the other direction. Switch means are provided responsive to the logic means to feed in A.-C. power in the proper phase to the network. The phase supplied to the correction network is 180° out of phase with that supplied to the rest of the network.

The output from the foregoing network is then the same as the output from a resolver. To simulate a synchro, two such networks are required, the one to provide the sine and the other the cosine. The outputs from these two networks are then fed into a three wire output providing a value corresponding to the sine of the angle, the sine of the angle plus 120° and the sine of the angle less 120°.

Other advantages of the invention will become apparent from the following description taken in conjunction with the accompanying drawings in which.

Figure 6:
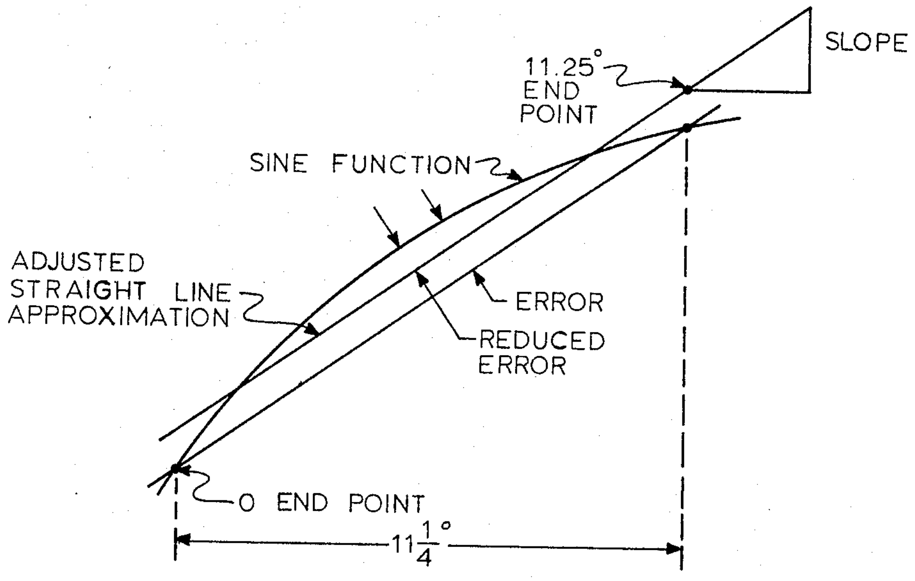
Figure 5:
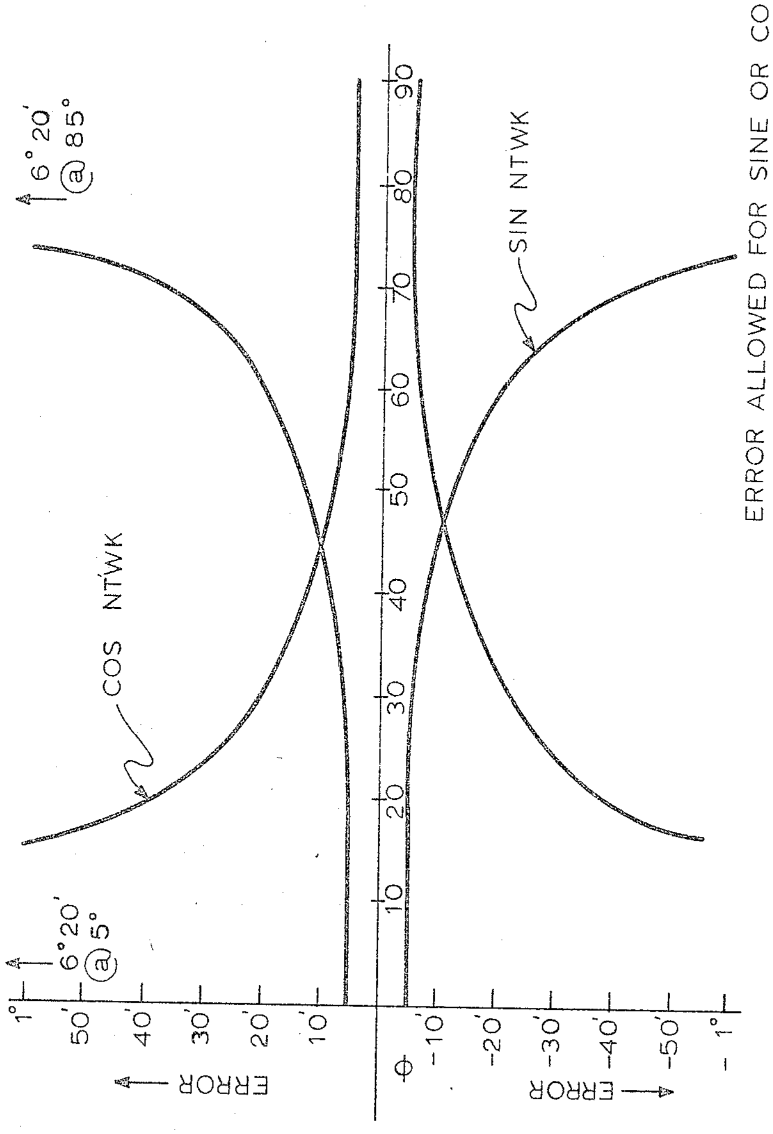
Figure 7:
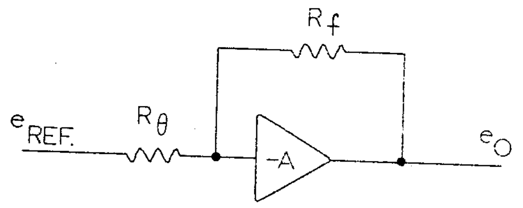
Figure 8:
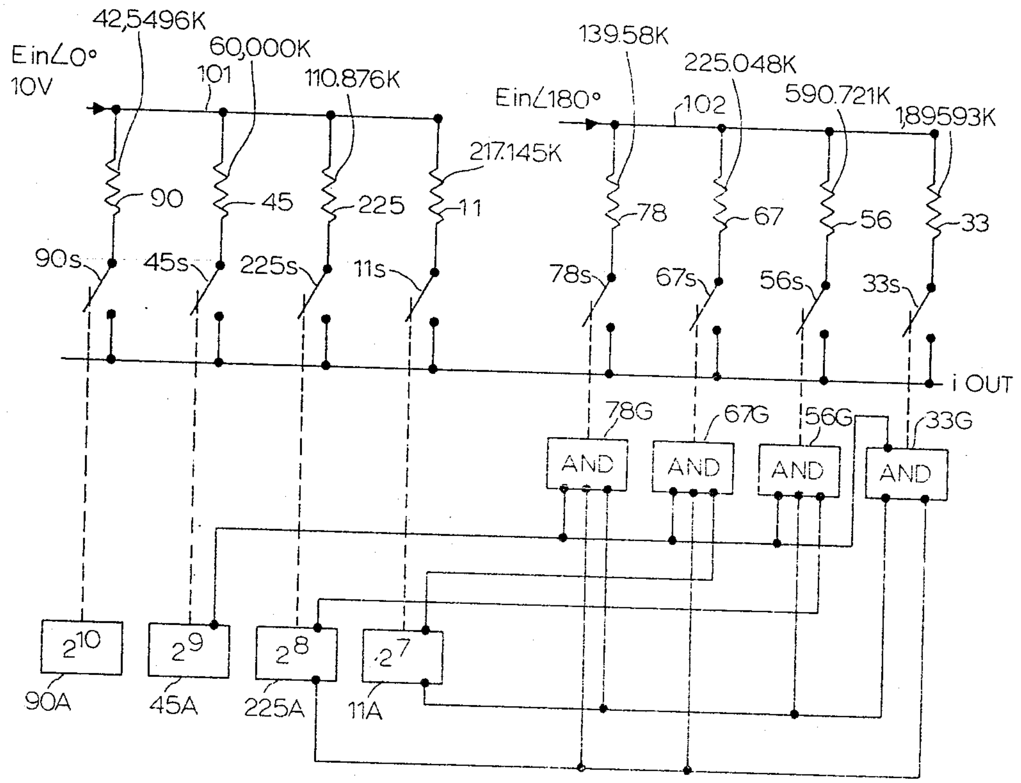
Figure 9:
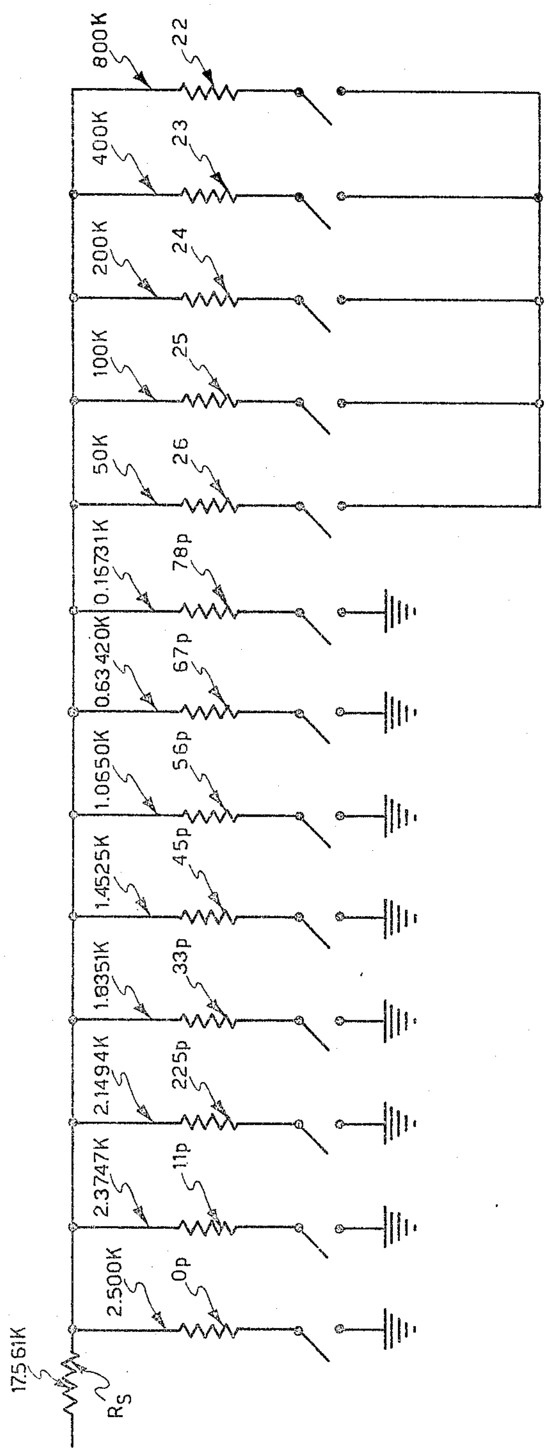
Figure 10:
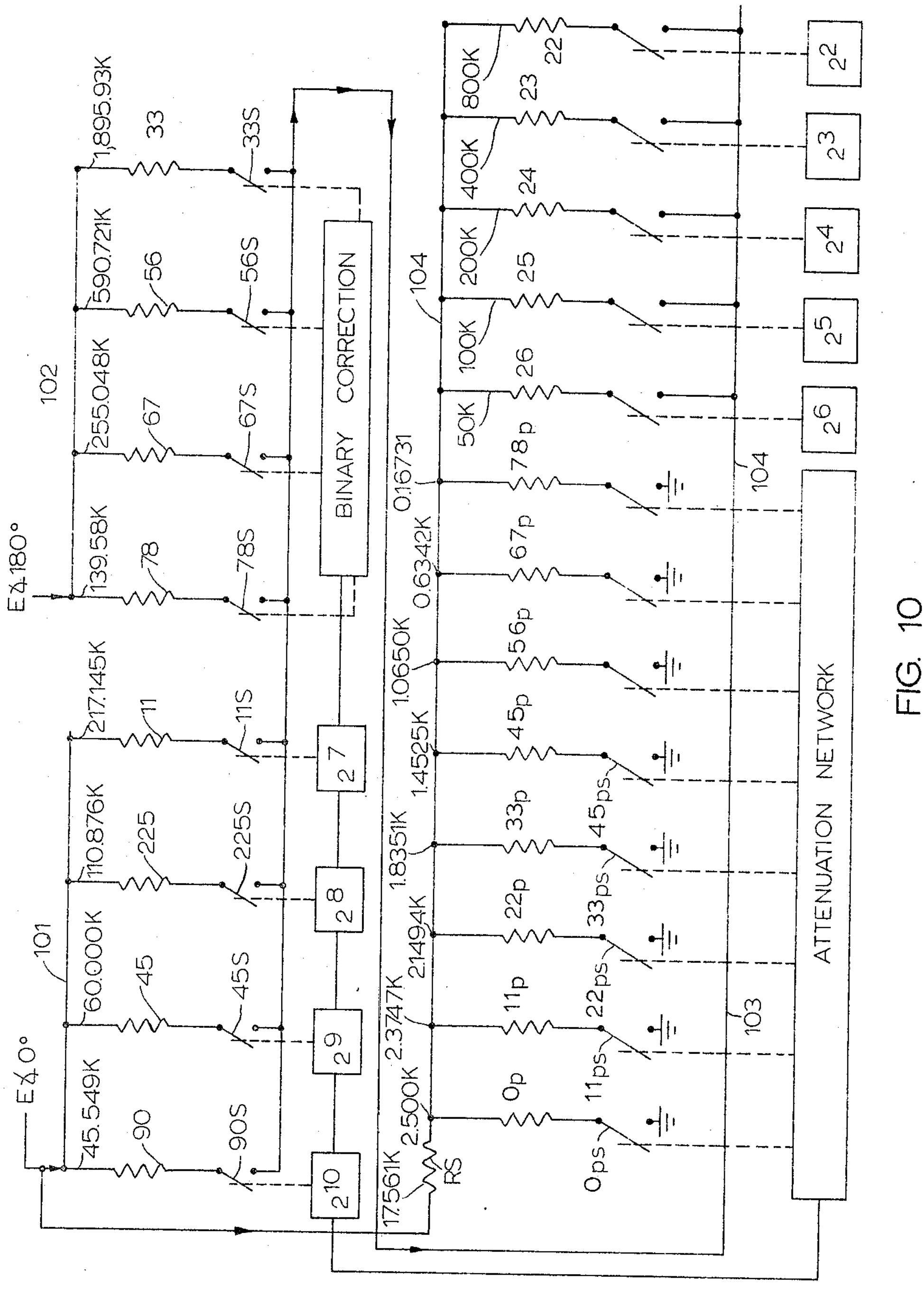
Figure 11:
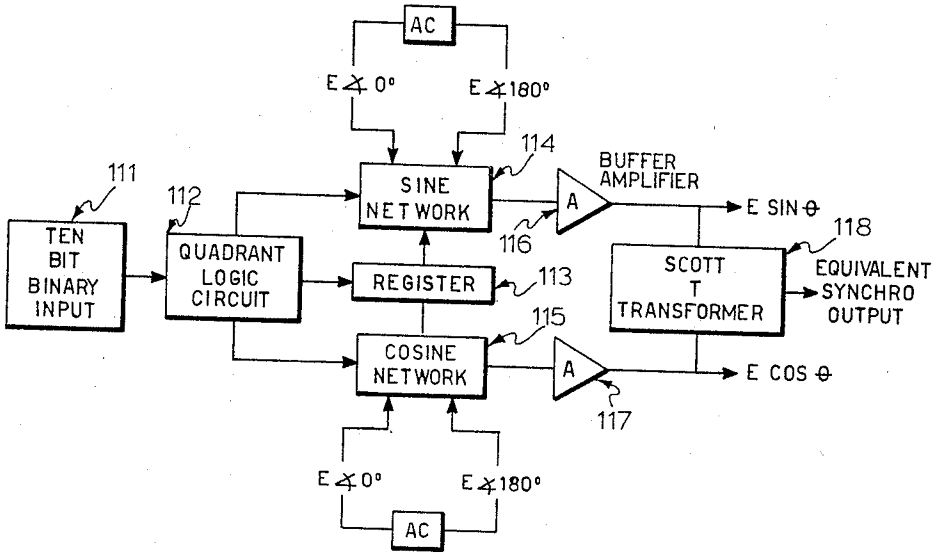
Figure 12A:
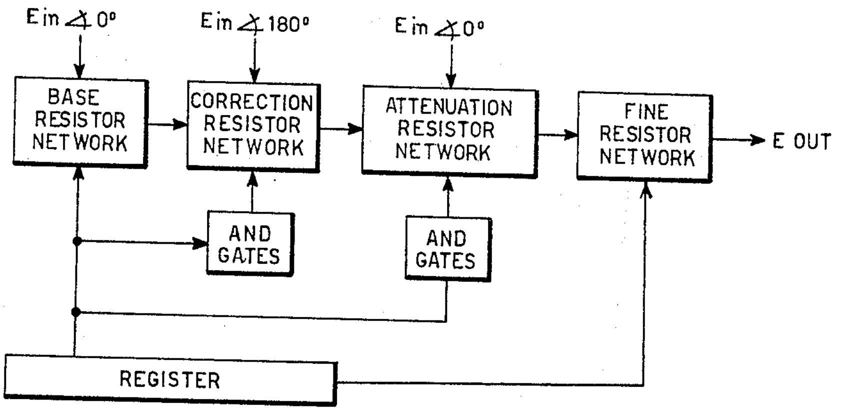
Figure 12B:
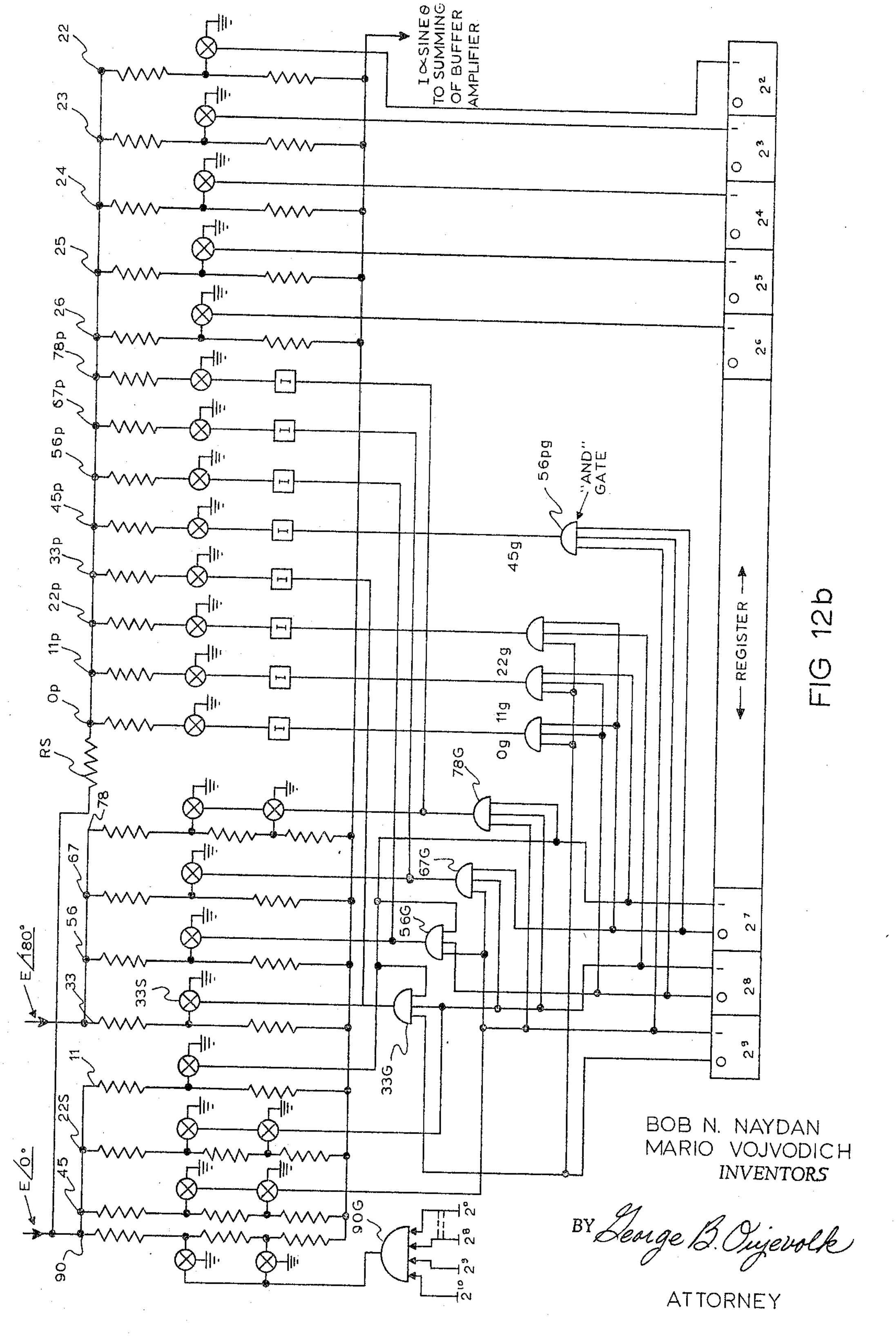
Figures 13, 14:
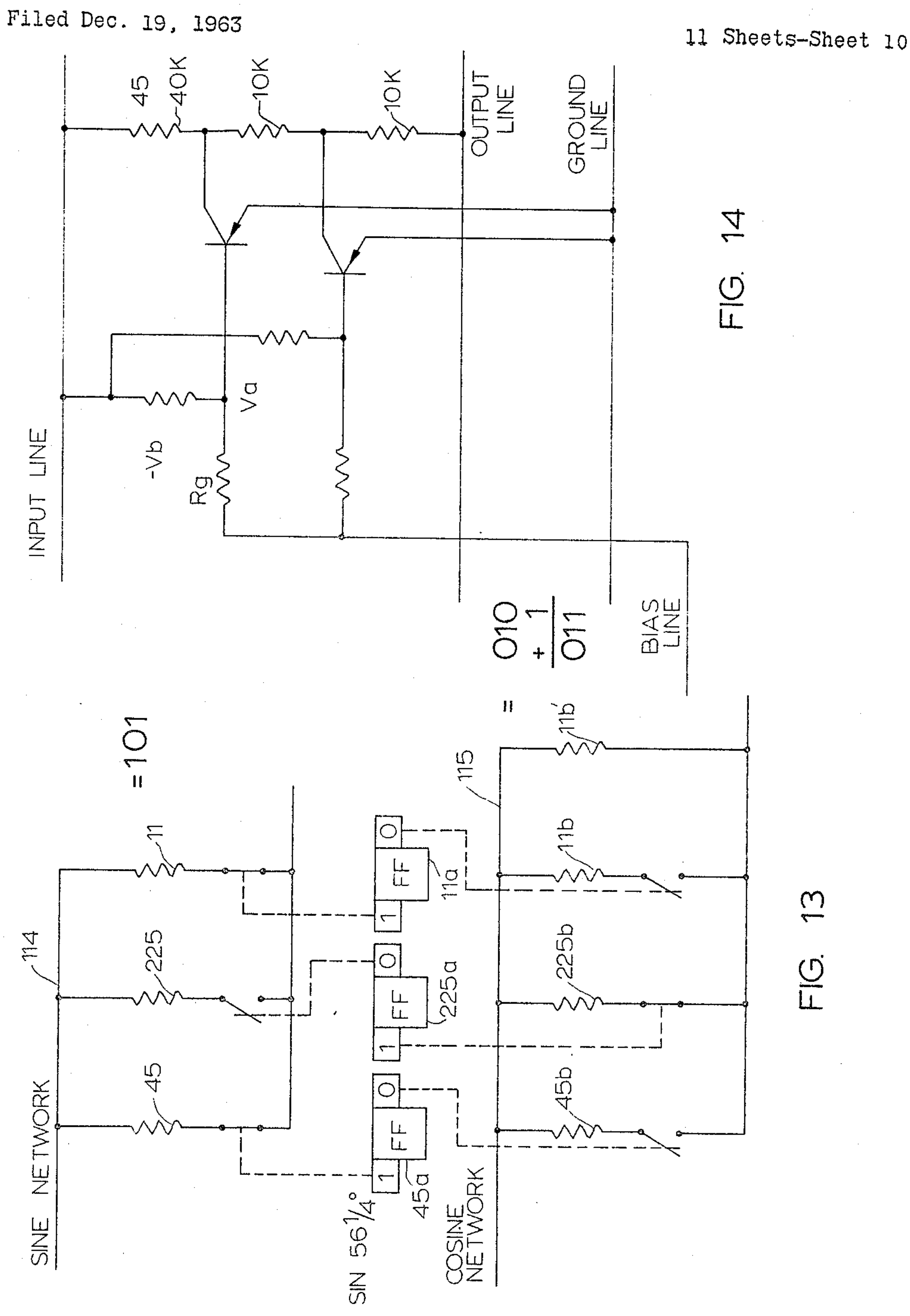
Figure 15:
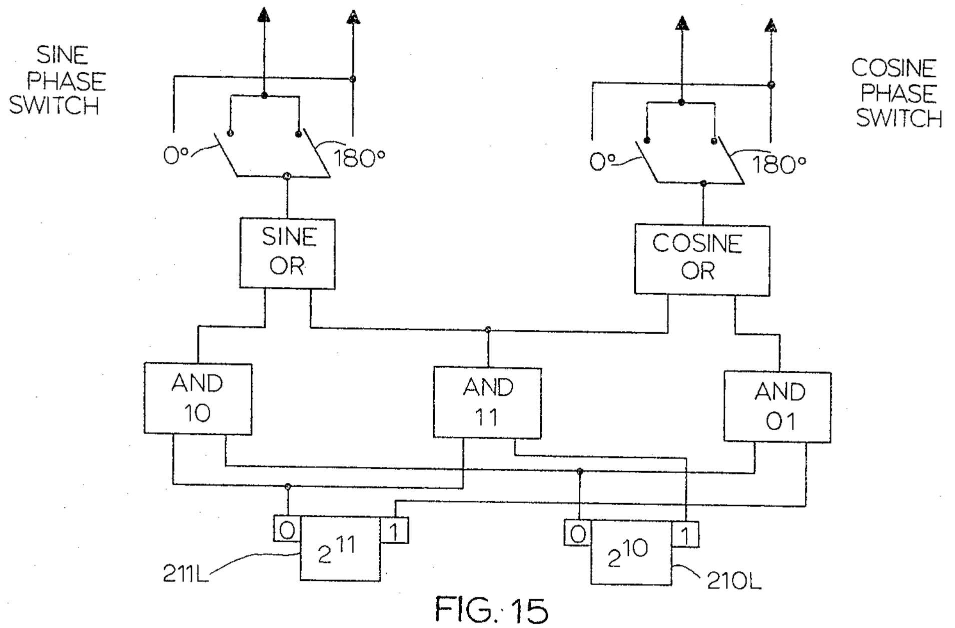
Figure 16:
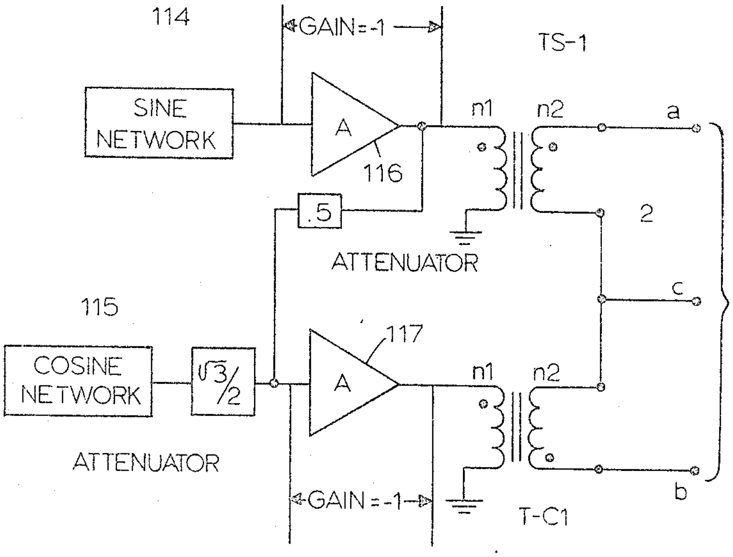

FIGURE 5 graphically shows a possible error curve for the system herein contemplated to explain why the system can tolerate more errors towards the sine of 90°;

FIGURE 6 views a portion of a sine curve and its straight line simulation and examines the error features;

FIGURE 7 depicts a schematic representation of the theoretical electronic effect of the network of resistors contemplated therein;

FIGURE 8 shows a portion of the resistor network contemplated herein providing base values;

FIGURE 9 shows a portion of the resistor network contemplated herein providing fine values;

FIGURE 10 is a schematic description of the base and fine resistor networks;

FIGURE 11 is a block diagram of the digital to synchro converter contemplated herein;

FIGURE 12*a* is a block diagram of the control of the resistor networks by the register;

FIGURE 12*b* is a schematic representation of the sine network shown in FIGURE 12*a*;

FIGURE 13 is a schematic representation of a portion of the register, the sine network and the cosine network illustrating the control of the sine and cosine networks by the register and integrating the values supplied therefrom as explained in Table 5;

FIGURE 14 schematically illustrates a switch arrangement contemplated herein;

FIGURE 15 is a schematic version of the phase switch arrangement used in the contemplated network; and, FIGURE 16 shows schematically an embodiment of the output portion of the network.

THEORY

Before describing the actual components used in the construction of the invention herein contemplated, it is essential to first understand the theory involved since in the final analysis, the components used in the heart of the invention consists mostly of transistor switches and resistors which in general physical construction will resemble those of the aforementioned prior art Schroeder et al. patent.

It is at once apparent that since the sine of an angle is equal to the cosine of ninety degrees minus the angle, a system which provides the one can be used to provide the other. For this reason, the term sinusoidal output is often used herein and by this term is meant either the sine or the cosine. For brevity, the explanation of the invention will be directed principally to providing the sine of an angle from a digital input corresponding to the angle, but this is solely for the purpose of explanation since as will be shown, the cosine of the angle can be provided in exactly the same way but with one additional component.

Figure 1:
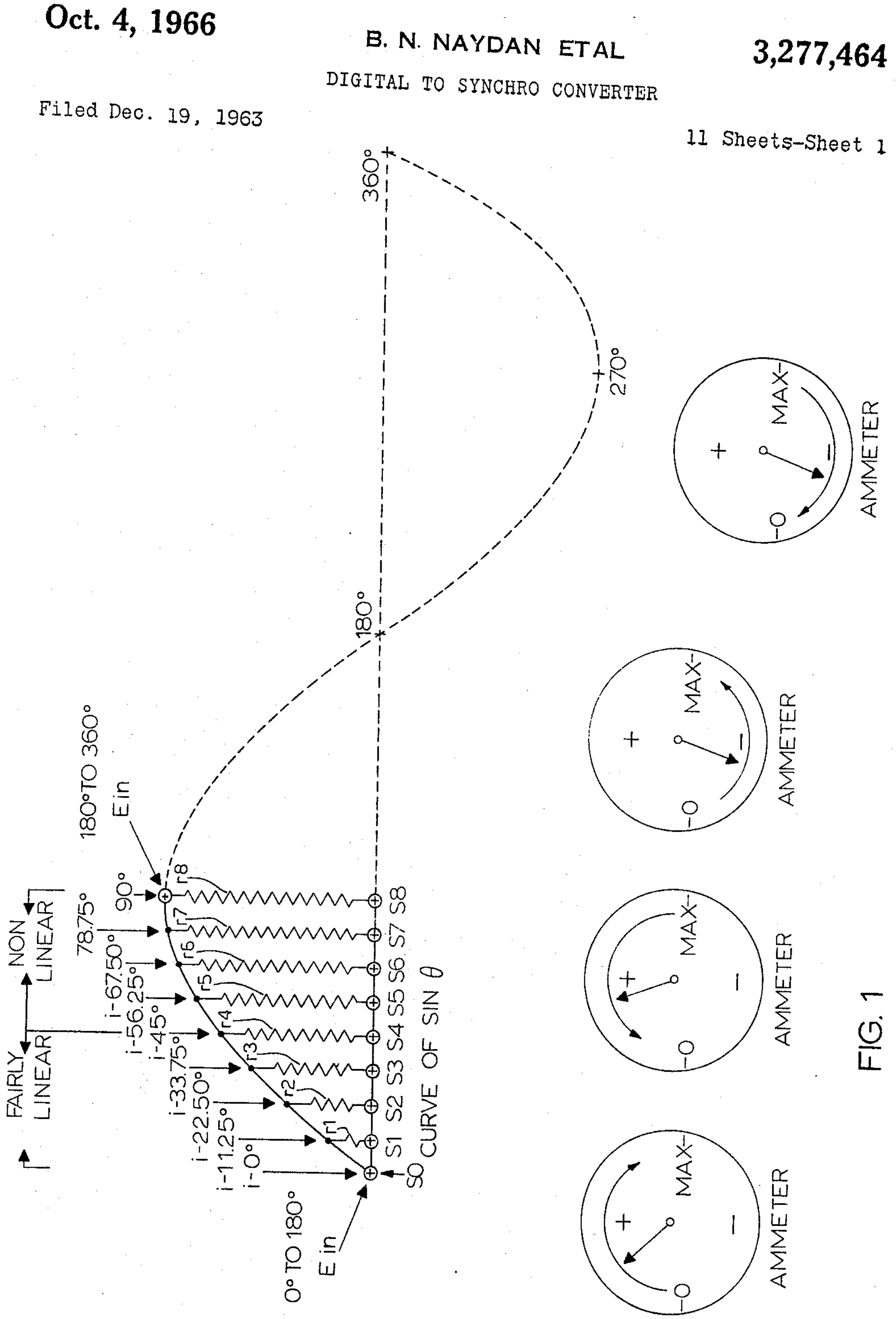
FIGURE 1 is a graphic representation of a sinusoidal curve and some of the fundamental mathematical concepts used in the present invention.

Looking first at FIGURE 1 there is shown a familiar sinusoidal curve labeled as "curve of sin $\theta$." Along the curve are labeled points corresponding to important angle values, namely, 0°, 11¼°, 22½°, 33¾°, 45°, 56¼°, 67½°, 78¾°, 90°, 180°, 270°, 360°. At each of these points between 0° and 90° is a resistor *r*1, *r*2, *r*3, *r*4, *r*5, *r*6, *r*7, *r*8. The base line is assumed to be an electrical input line and between each resistor and the input line is a switch S1, S2, S3, S4, S5, S6, S7, C8. Switches S0 and S90 are also provided at the 0° and 90° points. The line representing the sinusoidal curve between 0° and 90° is also treated as an electrical connection line so that the resistors from a parallel circuit with switches at the bottom to connect any resistor into the circuit. As can be seen by inspection with the naked eye, between 0° and 45° the curve is fairly linear. Between 45° and 90° the curve is non-linear. In going from 0° to 90°, the sine values for the angles shown, i.e., 0°, 11¼°, 22½°, 33¾°, 45°, 56¼°, 67½°, 78¾° and 90°, can be viewed as corresponding to the respective currents of a value *i*, obtained by sequentially switching in resistors *r*1 to *r*8, and feeding in at 0° a voltage $E_{in}$. Between 90° and 180° the sine values can be viewed as sequentially switching in the same resistors but in reverse order, i.e., *r*8, *r*7 . . . *r*1, while feeding in a voltage $E_{in}$ at 0°. When going from 180° to 270° the sine values can be viewed as the sequential switching into the circuit of resistors *r*1 to *r*8 while feeding in a voltage $E_{in}$ at the 90° point. While going from 270° to 360° the sine values can be viewed as the sequential switching in of resistors *r*8 to *r*1, i.e., in reverse order while feeding in a voltage $E_{in}$ at 90°.

From the foregoing analysis, it is apparent that for the 0° to 360° range, only the resistors used between 0° and 90° are needed. For values between 90° and 180° and 270° to 360° the actuating of switches S1 to S8 must be reversed. Between 0° and 180° the current is fed through switch S0 at the 0° point while between 180° and 360° the current is fed through switch S90 at the 90° point. By selecting proper values for resistors *r*1 to *r*8 and feeding in a correct voltage, it is therefore possible to devise a simple arrangement so that a digital input corresponding to 11¼ will switch in resistor *r*1, an input corresponding to 22½ will switch in resistor *r*2, etc., and the output will be a current corresponding to the sine of these angles. Naturally such a crude device has little use in modern computers and, in order to supply an acceptable device fine values must be provided between the points shown. In accordance with accepted computer practice the input will be a binary number, or, if the initial input is in degrees or radians, it can readily be converted to a binary number to make the invention useful with conventional computer arrangements. The crude arrangement shown in FIGURE 1 cannot be used for this purpose. This is because there can be no input to 33¾° since in the binary system, this is represented as 11¼°+22½°, and the same goes for 56¼°, 67½° and 78¾° which represent combinations of lower binary digits. Unfortunately, the sine of 33¾° is not the same as sin 11¼+sin 22½ and neither is the sin 56¼ the same as sin 45+sin 11¼, etc. Therefore, to properly provide a useful sine network, it is necessary to (*a*) select base resistor values which when fed a preselected input voltage will provide a current weight corresponding to sine values in the binary system; (*b*) account for the difference between the true sine value and the sine value obtained when several resistors are in the circuit corresponding to several base binary numbers used in the digital input; (*c*) provide fine resistor values in the binary system which can be used for the angle values between the selected base positions; (*d*) interrelate the fine resistor values selected with each base position so that the current value provided by the fine resistors can be combined with the current value provided by the base resistors; (*e*) provide for a logical programming of the base and fine resistors into the network in accordance with the quadrant of operation; and (*f*) control for the direction of current flow depending on the quadrant of operation.

In connection with the last-mentioned item, this statement is an oversimplification of the problem. The synchro output which is being simulated is an A.-C. output, yet, the language of problem (*f*) and the explanation hereinbefore given is in D.-C. terminology. This fact must be borne in mind in considering the network hereinafter described.

ACCURACY

With regard to the non-linearity of the sine curve between 45° and 90°, here, the particular characteristic of the synchro can be utilized. The synchro whose output will be simulated is a transformer and in operation, between 0° and 45° it works mostly from the sine value while between 45° and 90° it works mostly from the cosine value. Therefore, the system can tolerate more errors between 45° and 90° from the sine network than between 0° and 45°. Conversely, the system can tolerate more errors between 0° and 45° from the cosine network than between 45° and 90°. This fact plays an important consideration in the inventive concept.

Figure 2:
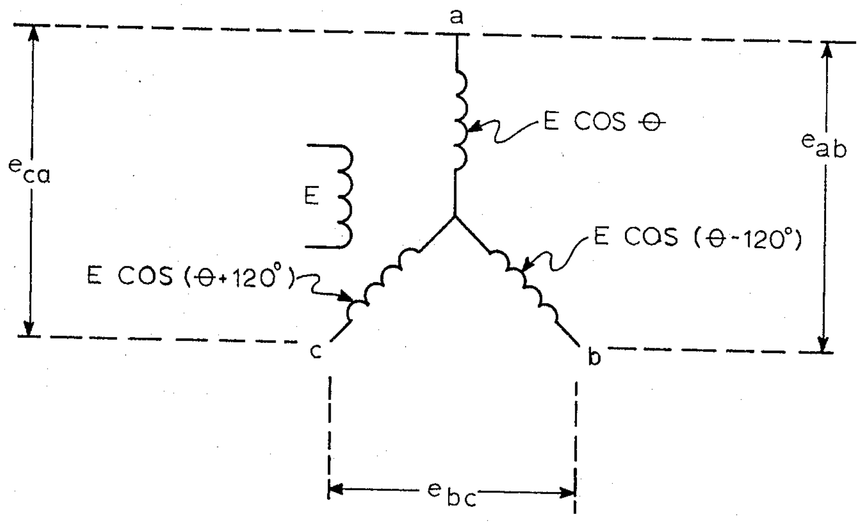
FIGURE 2 is a schematic and mathematical explanation of the values to be attained simulating a three wire synchro.

To understand this point, it is necessary to observe the similarity between a Scott-T type of network used in the output of the arrangement herein contemplated and a three wire synchro as shown in FIGURE 2.

From FIGURE 2 the following relations can be set forth regarding a three wire synchro:

$$e_{ab}=E\cos\theta-E\cos(\theta-120°)$$
$$e_{ab}=\sqrt{3}\sin(\theta+120°)$$
$$e_{bc}=E\cos(\theta-120°)-E\cos(\theta+120°)$$
$$e_{bc}=\sqrt{3}E\sin\theta$$
$$e_{ca}=E\cos(\theta+120°)-E\cos\theta$$
$$e_{ca}=\sqrt{3}E\sin(\theta-120°)$$

Figure 3:
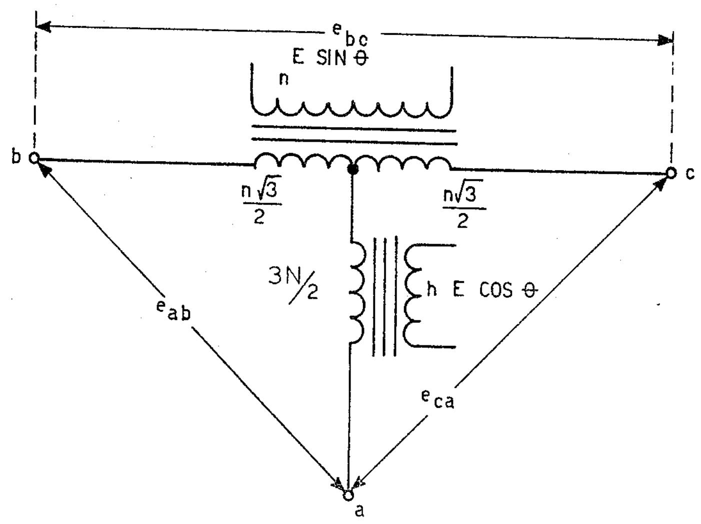
FIGURE 3 is a schematic and mathematical representation of the output of a Scott-T transformer to show how this output can be used as the end component of the system herein contemplated.

From FIGURE 3, the following similar information can be set forth regarding a Scott-T connection:

$$e_{ab}=\tfrac{3}{2}E\cos\theta-E\sqrt{3/2}\sin\theta$$
$$e_{ab}=\sqrt{3}\sin(\theta+120^\circ)$$
$$e_{bc}=\sqrt{3}E\sin\theta$$
$$e_{ca}=E\sin\theta\sqrt{3/2}-\tfrac{3}{2}E\cos\theta$$
$$e_{ca}=\sqrt{E}\sin(\theta-120^\circ)$$

Comparing corresponding equations for a synchro and a Scott-T transformer indicates the Scott-T connection with the turns ratio as shown is identical to a three wire synchro.

The importance of the Scott-T network is the fact that this is the output side of the present network.

Considering the present invention as some voltage value E multiplied by the sine of an angle $\theta$ in which there is an error or mistake $M_1$ in degrees and the cosine of angle $\theta$ in which there is an error $M_2$ in degrees.

Figure 4:
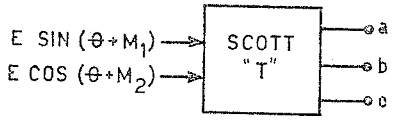
FIGURE 4 illustrates how the output from the device contemplated herein and the errors in the system are fed to the Scott-T transformer.

From FIGURE 4 the following equations can be provided:

(a) $$e_{ab}=E\sqrt{3}\left[\sqrt{3/2}\cos(\theta+M_2)-\frac{\sin(\theta+M_2)}{2}\right]$$

(b) $$e_{bc}=E\sqrt{3}[\sin(\theta+M_1)]$$

(c) $$e_{ca}=E\sqrt{3}\left[-\frac{\sin(\theta+e_1)}{2}-\sqrt{3/2}\cos(\theta+e_2)\right]$$

(d) $$e_{ab}=\angle-60^\circ+e_{ac}\angle+60^\circ+e_{bc}\angle 90^\circ=E\theta'$$

Substituting *a*, *b* and *c* into *d*, $$E\theta'=\sqrt{3/2}(\cos\theta\cos M_2-\sin\theta\sin M_2)+j\sqrt{3/2}(\sin\theta\cos M_1+\cos\theta\sin M_1)$$

Therefore $$\theta'=\tan^{-1}\frac{\sin(\theta+M_1)}{\cos(\theta+M_2)}$$

where $\theta'$ is the synchro position angle and for simplicity assume $E\sqrt{3}=1$, $M_1$ is the error in degrees of sin $\theta$ network, $M_2$ is the error in degree of cos $\theta$ network.

To utilize the above expression it is necessary to (1) Decide accuracy of $\theta'$, (2) Assume error of $M_1$ at $\theta'$, (3) Solve for remaining error allowable in $M_2$ then assume $M_2=\theta$ and solve for $M_1$.

To appreciate the foregoing solving the above equation using as the allowable error for $\theta'$ a value of ±5 minutes first assume $M_1=0$ and solve for $M_2$, then assume $M_2=0$ and solve for $M_1$.

A plot of this expression substituting the conditions is shown in FIGURE 5. This indicates that near 90° the error in the sine and near 0° the error in the cosine networks can be very large without affecting the angular position of the synchro.

VALUES

In carrying the invention into practice, it is important to first formulate tables of the theoretical values which will be used such as Table 1. From this table, a second table must be calculated giving the actual values used.

*Table 1.—The circle, arcs, digital values, sine and cosine values useful for the purpose of the present invention*

| Degrees | Binary Value | True Sine | True Cosine | Approx. Sine Values of Binary Weight | Decimal Equivalent |
|---|---|---|---|---|---|
| 360 | $2^{12}$ | .00000 | 1.00000 | ---- | 65,536 |
| 180 | $2^{11}$ | .00000 | −1.00000 | ---- | 32,768 |
| 90 | $2^{10}$ | 1.00000 | .00000 | ---- | 16,384 |
| 78¾ | $2^7+2^8+2^9$ | .98079 | ---- | ---- | 8,192 |
| 67½ | $2^8+2^9$ | .92388 | ---- | ---- | 4,096 |
| 56¼ | $2^7+2^9$ | .83147 | ---- | ---- | 2,048 |
| 45 | $2^9$ | .70711 | .70711 | ---- | 1,024 |
| 33¾ | $2^7+2^8$ | .55557 | .83147 | ---- | 512 |
| 22½ | $2^8$ | .38268 | .92388 | ---- | 256 |
| 11¼ | $2^7$ | .19509 | .98079 | ---- | 128 |
| 5.625 | $2^6$ | .09802 | .99518 | 9,800 | 64 |
| 2.8125 | $2^5$ | .04096 | .99880 | 4,900 | 32 |
| 1.4063 | $2^4$ | .02455 | .99969 | 2,450 | 16 |
| 0.7031 | $2^3$ | .01228 | .99993 | 1,225 | 8 |
| 0.3516 | $2^2$ | .00615 | .99998 | 613 | 4 |
| 0.1758 | $2^1$ | .00306 | .99999 | 306 | 2 |
| 0.0880 | $2^0$ | .00153 | 1.00000 | 153 | 1 |

BASE VALUES

Taking the values shown in Table 1 and looking again at FIGURE 1, the arc between 0° and 90° is divided into nine base points arbitrarily designated as 0°, 11¼°, 22½°, 33¾°, 45°, 56¼°, 67½°, 78¾° and 90° each of which is either the first or the last point on one of eight portions of the corresponding sinusoidal curve. However, merely representing the entire curve as eight straight line connections between these points results in an error factor which is largest towards the midpoint of each line connection and least towards the end. By trial and error, it is rapidly possible to pull up the straight line nearer to the curve somewhat and equalize the error. This means that the two end points and the largest central error point are approximately equal, as shown in FIGURE 6.

From FIGURE 6 and Table 1, Table 2 can be provided which shows the eight segments between 0° and 90°, the slope or tangent of each segment on the sinusoidal curve, the value of the adjusted end points and the binary difference which will result and which must be accounted for when the input will enable two resistors, i.e., at 33¾°, 56¼°, 67½° and 78¾°.

It is important to realize that the adjusted end point is not the value corresponding to the first point of the next segment. The adjusted end point is the point obtained by pulling up the line segment to the curve. This feature enters into the binary correction thus:

11¼°—end point setting=11° 18′
22½°—end point setting=22° 34′
Sin 11° 18′=0.19595
Sin 22° 34′=0.38376

But

Sin 33° 52′ is not 0.57971
Sin 33° 52′ is 0.55726

Correction for 33¼° is −.02245

Similarly the corrections for 56¼°, 67½° and 78¾° are given in the "binary correction" column.

With the foregoing preliminary explanation it is now necessary to calculate Table 2 and the values of the base resistors.

*Table 2*

| Segment | Slope=m | End Point Voltage $E_p$ | Binary Correction | $2^{45^\circ}$ | $2^{22.5^\circ}$ | $2^{11.25^\circ}$ |
|---|---|---|---|---|---|---|
| 0–11.25° | 0.19552 | 0.19595 | 0 | 0 | 0 | 0 |
| 11.25–22.5° | 0.18754 | 0.38376 | 0 | 0 | 0 | 1 |
| 22.5°–33.75° | 0.17278 | 0.55726 | 0 | 0 | 1 | 0 |
| 33.75°–45° | 0.15129 | 0.70916 | −0.02245 | 0 | 1 | 1 |
| 45°–56.25° | 0.12360 | 0.83308 | 0 | 1 | 0 | 0 |
| 56.25°–67.5° | 0.09367 | 0.92609 | −0.07203 | 1 | 0 | 1 |
| 67.5°–78.75° | 0.05795 | 0.98404 | −0.16683 | 1 | 1 | 0 |
| 78.75°–90° | 0.01596 | ---- | −0.30483 | 1 | 1 | 1 |

Considering the network one leg at a time, the equivalent network can be viewed as FIGURE 7.

Here we can consider the input voltage to the network as being reference voltage, $e_{ref}$, in a resistor $R_\theta$ related to the input angle, a gain —K, a parallel resistor $R_f$ and an output $e_o$.

From FIGURE 7 is can be stated that $$\frac{e_{ref}}{R_\theta}=\frac{e_o}{R_f}$$

(assuming —A to be much greater than 1), also, $$e_o=E_{p\theta}e_o \text{ max.}$$

where $e_o$ is the instantaneous output, $E_{p\theta}$ is the end point voltage of the attenuation section from Table 2 and $e_o$ max. is the output voltage for 90°, also, $$\frac{R_f}{e_o \text{ max.}}=K'$$

and $$\frac{e_{ref}}{R_\theta}K'=E_{p\theta}$$

and $$K=\frac{E_{p\theta}R_\theta}{E_{ref}}$$

It is now possible to solve for the desired resistors by trial and error, for example, $$K'=\frac{E_p\ 45°\times R_{45°}}{E_{ref}}$$

Assume an input or reference voltage of 10 volts and a value of 60,000 ohms for 45° and $e_o$ maximum of 17 volts, then from Table 2

$$K'=\frac{(0.70916)(60{,}000)}{10}$$

$$K'=4254.96$$

therefore $$K'=\frac{R_f}{e_o \text{ maximum}}$$

and $$R_f=K'_{e_o} \text{ maximum}$$

$$R_f=4254.96\ (17\text{ v.})=106.374\text{K}$$

Now solving in the same manner for 22.50°

$$R_\theta=\frac{e_{ref}K'}{E_{p\theta}}$$

and from Table 2

$$E_p22.5=0.38376$$

$$R_{22.5}=\frac{10\times 4254.96}{0.38376}$$

$$R_{22.5}=110.876\text{K}$$

Similarly, $$R_{11.25}=217.145\text{K}$$

and $$R_{90}=4.25496\text{K}$$

Up until this point the explanation has been purely mathematical and not a single actual component has been mentioned. With these resistor values it is now possible to build a portion, 101 of the base network. This is shown in FIGURE 8 where the base resistor portion 101 of the network is shown on the left and has parallel resistor branches 90, 45, 225 and 11 which correspond to the angle values of 90°, 45°, 22.50° and 11.25°. Throughout the present specification, meaningful part numbers are used. To the right of FIGURE 8 in network 102 are seen the numbers 33, 56, 67 and 78 which as will be shown represent the correction for angles of 33¾°, 56¼°, 67½° and 78¾°.

Each branch is enabled by a switch shown schematically as a mechanical switch but is in reality a transistor switch.

Each switch is controlled by a binary input shown as a block with the numeral $2^{10}$, $2^9$, $2^8$, $2^7$.

The switches have the number of the branch with the letter "S" while the binary inputs are numbered 90A (for angle of 90°), 45A, 225A and 11A.

Therefore when an angle value of 11¼° is fed to the input, this goes to input 11A closing resistor switch 11S, and when the angle value is 22½°, this is fed to input 225A closing switch 225S, etc.

BASE BINARY INPUTS OF COMPOSITE CHARACTER

Where the angle is 33¾°, this value is fed to binary inputs 11A and 225A closing both switches 11S and 225S. But as previously pointed out, the closing of these two branches would result in a sine value of 0.57971 (sin 33° 52′) and what is needed is a value of 0.55726 and as shown in Table 2 that a correction of —0.02245 is needed. In a D.-C. circuit such a subtraction would be accomplished by a D.-C. counter-current of this value. Since this is an A.-C. network, the same thing is accomplished by feeding into the correction network a voltage 180° out of phase with the input voltage to the base branches. Therefore, any input from branch 11A and 225A is also fed to "and" gate 33G. When "and" gate 33G receives a signal from the branches it closes switch 33S in correction network 102 which then passes through resistor 33 providing an equal value signal but 180° out of phase with the input. Similarly switches 56S and 67S are closed when the corresponding "and" gate receives signals from inputs 45A with 11A and 45A with 225A. With regard to "and" gate 78G this gate will receive three inputs and at the same time gate 33G will also receive inputs which will close both switches. However, the signal line from input 45A is also fed to "and" gate 33G. Whenever this particular gate receives these three inputs, the output therefrom is blocked and switch 33S does not close.

The values of the resistor branches in the correction network are found by using the values shown in Table 2 according to the formula previously used by replacing $E_{p\theta}$ with the correction for $\theta$, i.e., instead of the formula $$R_\theta=\frac{e_{ref}K'}{E_{p\theta}}$$

use $$R_C=\frac{e_{ref}K'}{C_\theta}$$

where $R_C$ is the resistor value in the correction branch and $C_\theta$ is the binary correction value from Table 2. In this way the following values are obtained:

$R_C33$ (angle of 33¾)—1895.93K
$R_C56$ (angle of 56¼)—590.721K
$R_C67$ (angle of 67½)—255.048K
$R_C78$ (angle of 78¾)—139.58K Up to this point then we have (a) selected base resistor values which when fed a preselected input voltage will provide a current weight corresponding to sine values in the binary system, (b) made adjustments to account for the difference between the true sine value and the sine value obtained when several resistors are in the circuit corresponding to several base binary numbers used in the digital input.

FINE VALUES AND THE APPORTIONING OF FINE VALUES BETWEEN SUCCESSIVE BASE VALUES

It is now necessary to (c) provide for fine resistor values and then (d) interrelate the fine and base resistor values.

For the purpose of explanation, a short-cut will be taken by removing the first two bits from Table 1, i.e., $2^0$ and $2^1$.

This will reduce the efficiency of the network somewhat but simplifies the explanation of what takes place as well as highlights the fact that the binary values selected are purely arbitrary.

Values will therefore be provided for fine resistors having a value of $2^2$ to $2^6$.

From FIGURE 9, it can be seen that the total conductance of the fine resistor network from between $2^2$ and $2^6$ is $$G=\frac{1}{R}+\frac{1}{2R}+\frac{1}{4R}+\frac{1}{8R}+\frac{1}{16R}=\frac{31}{16R}$$

For 11¼° the resistor value $^{31}/_{16}$R must account for sin (11¼—least significant bit).

In the present instance however, the least significant bit is $2^2$ or 0.3516° (See Table 1).

This difference in terms of percentage L of one bit is:

$$L=\frac{\sin\ (11\tfrac{1}{4}^\circ-0.3516^\circ)}{\sin\ 11\tfrac{1}{4}^\circ}=0.96875$$

Also, the total voltage V across the fine branches is to the total voltage $e_r$ as the resistance of the fine branches is to the total resistance or $$V=\frac{e_r\dfrac{R_{pn}\frac{16R}{31}}{R_{pn}+\frac{16R}{31}}}{R_s+\dfrac{R_{pn}\frac{16R}{31}}{R_{pn}+\frac{16R}{31}}}$$

where $R_{pn}$ is the value of the attenuating resistor supplying the 11.25° slope. And $R_S$ is the series resistor to the fine network. The derivation of this equation is given at length in the Schroeder et al. U.S. Patent No. 3,071,324.

The slope M of the output current adjusted to the end point by the percentage L is (the value K being 425496):

$$ML=\frac{VK}{\frac{16R}{31}}$$

and combining the above two equations.

$$R_{pn}=\frac{R_S\frac{16R}{31}}{\frac{K}{LM}-\left(R_S-\frac{16R}{31}\right)}$$

Assuming an attenuation from 0° to 11.25° or $0.R_p$= 2.5K; $R$=50K; solving for $R_S$=17.561K; substituting for $R_S$ and solve for all $R_{pn}$.

For the attenuation between 11.25° and 22.50°, i.e., $$11R_p=\frac{R_S\frac{16R}{31}}{\frac{K}{LM}-\left(R_S-\frac{16R}{31}\right)}=$$

$$\frac{(17.561\text{K})\frac{16}{31}50\text{K}}{\frac{4254.96}{0.96875(.18754)}}-\left(17.561\text{K}-\frac{16}{31}50\text{K}\right)$$

Therefore:

$11R_p$=2.3747K
$22R_p$=2.14939K
$33R_p$=1.8351K
$45R_p$=1.4525K
$56R_p$=1.0650K
$67R_p$=0.63420K
$78R_p$=0.16731K also resistor 25=100K; resistor 24=200K; resistor 23=400K; resistor 22=800K The values just derived provide the fine values to be used for branches 22 to 26 corresponding to fine values of $2^2$ to $2^6$, forming circuit 104 of FIGURE 10 and the attenuation $R_p$ for each of the base positions which will supply the proper slope to the curve, forming circuit 103. The combined network is shown in FIGURE 10.

The cosine network is identical with the sine network. The cosine will be produced by supplying to the cosine network the complements to the sine network and the complement value of the sine network differs from the cosine value by one least significant bit. The cosine network therefore includes one additional least significant resistor branch which is added into or summed in the cosine network. Therefore, the cosine network is controlled by the same register as the sine network except that the signals to the switches are complementary. If the command to the switch in the sine network is to enable, the command in the cosine network is shunted to ground. The additional least significant bit in the cosine network however is not subject to control by the register. It is always in the network.

THE QUADRANT

The particular quadrant of operation and the reference polarity in that quadrant is determined by a logic arrangement set forth in Table 3.

*Table 3*

| Angle | Two Most Significant Bits | | Sine Network | | Cosine Network | |
|---|---|---|---|---|---|---|
| | $2^{11}$ / 180° | $2^{10}$ / 90° | Reference Polarity: 0—Normal; 1-180° Phase Reversal | Invert and Add+1: 0—No; 1—Yes | Reference Polarity: 0—Normal; 1-180° Phase Reversal | Invert and Add+1: 0—No; 1—Yes |
| 0-90 | 0 | 0 | 0 | 0 | 0 | 0 |
| 90-180 | 0 | 1 | 0 | 1 | 1 | 1 |
| 180-270 | 1 | 0 | 1 | 0 | 1 | 0 |
| 270-360 | 1 | 1 | 1 | 1 | 0 | 1 |

Using the foregoing mathematical analysis, an arrangement can now be provided to supply the desired sinusoidal output from a digital input.

As shown in FIGURE 11, the angle value $\theta$ is given in binary form from the binary input unit 111 to the logic circuit 112 to determine the quadrant. The output from the logic circuit 112 is fed to register 113. Also, the corresponding corrections for the quadrant are fed to the sine network 114 and the cosine network 115. These networks will supply values corresponding to the sine and cosine of the input binary value to buffer amplifiers 116 and 117. These in turn feed into Scott-T transformer 118 supplying an output corresponding to a three-wire synchro. The output from the buffer amplifiers 116 and 117 is the same as the output from a resolver and if desired can be used as such.

LOGIC

The foregoing explanation of the mathematical features of the invention requires some amplification with regard to components.

The driving logic of base resistors 11, 225, 45 and 90 also controls two gating circuits (*a*) The gating circuits of the correction network 102, and (*b*) The gating circuits of the attenuation network 103.

A block diagram of this is shown in FIGURE 12*a*. Although a more detailed drawing is possible such a drawing results in a multitude of crossing connection wires to the resistor networks and to the "and" gates. The lines may be so numerous that they become difficult to follow. To simplify the explanation of the wiring connections, it is preferable to use tables as shown in Table 4A and in Table 4B.

peated except that each current phase has now shifted by 180°. The input in bits is fed to the register which supplies corresponding binary signals until 90°. At the same time, these bits are being fed to "and" gates. At 90° the register is so set that the next bit weight will invert the register and add one least significant bit. Therefore, although this bit appears in the input, it does not appear in the register; instead, 101.25° appears in the input as 01001 but in the register it is inverted and one bit is added giving 0111. This value also corresponds to the sine of 78.75. In the same way, the requisite signal for 112.50° is identical with the register signal for 67.50°.

The next two columns left are the "Attenuation Resistor" and "Correction Resistor" columns. Four of the attenuation resistors are fed signals directly from the register flip-flop while four attenuation resistors are fed signals from the correction resistor "and" gates. The signal to the eight attenuation resistor switches are through "and" gates.

THE GATING CIRCUITS

The control of the correction resistors and attenuation resistors is explained in Table 4A and shown in FIGURE

*Table 4A.—Digital to synchro converter sine network truth table*

| Base Resistors | | | | Correction Resistors | | | | Attenuation Resistors | | | | | | | | Reference Phase | Register | | | | Binary Input | | | | | Digital Angle Value |
|---|---|---|---|---|---|---|---|---|---|---|---|---|---|---|---|---|---|---|---|---|---|---|---|---|---|---|
| 90° | 45° | 22.5° | 11.25° | 33.75° | 56.25° | 67.5° | 78.75° | 0° | 11.25° | 22.5° | 33.75° | 45° | 56.25° | 67.5° | 78.75° | | 90° | 45° | 22.5° | 11.25° | 180° | 90° | 45° | 22.5° | 11.25° | |
| 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0° |
| 0 | 0 | 0 | 1 | 0 | 0 | 0 | 0 | 0 | 1 | 0 | 0 | 0 | 0 | 0 | 0 | 0 | 0 | 0 | 0 | 1 | 0 | 0 | 0 | 0 | 1 | 11.25° |
| 0 | 0 | 1 | 0 | 0 | 0 | 0 | 0 | 0 | 0 | 1 | 0 | 0 | 0 | 0 | 0 | 0 | 0 | 0 | 1 | 0 | 0 | 0 | 0 | 1 | 0 | 22.50° |
| 0 | 0 | 1 | 1 | 1 | 0 | 0 | 0 | 0 | 0 | 0 | 1 | 0 | 0 | 0 | 0 | 0 | 0 | 0 | 1 | 1 | 0 | 0 | 0 | 1 | 1 | 33.75° |
| 0 | 1 | 0 | 0 | 0 | 0 | 0 | 0 | 0 | 0 | 0 | 0 | 1 | 0 | 0 | 0 | 0 | 0 | 1 | 0 | 0 | 0 | 0 | 1 | 0 | 0 | 45.00° |
| 0 | 1 | 0 | 1 | 0 | 1 | 0 | 0 | 0 | 0 | 0 | 0 | 0 | 1 | 0 | 0 | 0 | 0 | 1 | 0 | 1 | 0 | 0 | 1 | 0 | 1 | 56.25° |
| 0 | 1 | 1 | 0 | 0 | 0 | 1 | 0 | 0 | 0 | 0 | 0 | 0 | 0 | 1 | 0 | 0 | 0 | 1 | 1 | 0 | 0 | 0 | 1 | 1 | 0 | 67.50° |
| 0 | 1 | 1 | 1 | 0 | 0 | 0 | 1 | 0 | 0 | 0 | 0 | 0 | 0 | 0 | 1 | 0 | 0 | 1 | 1 | 1 | 0 | 0 | 1 | 1 | 1 | 78.75° |
| 1 | 0 | 0 | 0 | 0 | 0 | 0 | 0 | 1 | 0 | 0 | 0 | 0 | 0 | 0 | 0 | 0 | 0 | 0 | 0 | 0 | 0 | 1 | 0 | 0 | 0 | 90.00° |
| 0 | 1 | 1 | 1 | 0 | 0 | 0 | 1 | 0 | 0 | 0 | 0 | 0 | 0 | 0 | 1 | 0 | 0 | 1 | 1 | *1 | 0 | 1 | 0 | 0 | 1 | 101.25° |
| 0 | 1 | 1 | 0 | 0 | 0 | 1 | 0 | 0 | 0 | 0 | 0 | 0 | 0 | 1 | 0 | 0 | 0 | 1 | 1 | *0 | 0 | 1 | 0 | 1 | 0 | 112.50° |
| 0 | 1 | 0 | 1 | 0 | 1 | 0 | 0 | 0 | 0 | 0 | 0 | 0 | 1 | 0 | 0 | 0 | 0 | 1 | 0 | *1 | 0 | 1 | 0 | 1 | 1 | 123.75° |
| 0 | 1 | 0 | 0 | 0 | 0 | 0 | 0 | 0 | 0 | 0 | 0 | 1 | 0 | 0 | 0 | 0 | 0 | 1 | 0 | *0 | 0 | 1 | 1 | 0 | 0 | 135.00° |
| 0 | 0 | 1 | 1 | 1 | 0 | 0 | 0 | 0 | 0 | 0 | 1 | 0 | 0 | 0 | 0 | 0 | 0 | 0 | 1 | *1 | 0 | 1 | 1 | 0 | 1 | 146.25° |
| 0 | 0 | 1 | 0 | 0 | 0 | 0 | 0 | 0 | 0 | 1 | 0 | 0 | 0 | 0 | 0 | 0 | 0 | 0 | 1 | *0 | 0 | 1 | 1 | 1 | 0 | 157.50° |
| 0 | 0 | 0 | 1 | 0 | 0 | 0 | 0 | 0 | 1 | 0 | 0 | 0 | 0 | 0 | 0 | 0 | 0 | 0 | 0 | *1 | 0 | 1 | 1 | 1 | 1 | 168.75° |
| 0 | 0 | 0 | 0 | 0 | 0 | 0 | 0 | 1 | 0 | 0 | 0 | 0 | 0 | 0 | 0 | 1 | 0 | 0 | 0 | 0 | 1 | 0 | 0 | 0 | 0 | 180.00° |

*Invert and add +1.

Looking at Table 4A, on the extreme right are shown the angular base input values in degrees (in the column headed "Digital Angle Values"). It is assumed, if this is the input to the system that there is a decimal to binary converter which will convert the digital angle value into the binary value shown. As is evident, the table need only go to 180°. This is because in the column headed "Binary Input" at 180° a number of "1" appears. This simply means that from 180° to 360° Table 4A is re- 12*b*. Although FIGURE 12*b* shows the entire sine network and its "and" gates, it is better understood from a table such as Table 4B. With regard to the base resistor column of Table 4A, the only unusual feature occurs at 90°. This indeed is a seldom used resistor branch. In fact it is used only at 90° and 270° to get "over the hump" on the curve. Therefore as shown in the drawing, this resistor is enabled only by gate 90G. This gate in turn requires inputs from all the flip-flops.

*Table 4B*

| Flip-Flop | | | $0_p$ | $11_p$ | $22_p$ | $33_p$ | $45_p$ | $56_p$ | $67_p$ | $78_p$ |
|---|---|---|---|---|---|---|---|---|---|---|
| | Attenuation Resistor | | $0_p$ | $11_p$ | $22_p$ | $33_p$ | $45_p$ | $56_p$ | $67_p$ | $78_p$ |
| | Correction Resistor | | | | | 33 | | 56 | 67 | 78 |
| | Gate | | 0G | 11G | 22G | 33G | 45G | 56G | 67G | 78G |
| | Register | | | | | | | | | |
| 11A | $2^7$ | 0 | X | | X | | X | | X | |
| | | 1 | | X | | X | | X | | X |
| 225A | $2^8$ | 0 | X | X | | | X | X | | |
| | | 1 | | | X | X | | | X | X |
| 45A | $2^9$ | 0 | X | X | X | X | | | | |
| | | 1 | | | | | X | X | X | X |

Table 4B shows the "and" gate connections for the principal base flip-flops in the register. Each flip-flop has two sides, a "0" side and a "1" side. The "0" side signal applies when the corresponding resistor is not in the circuit; the "1" side signal applies when the corresponding resistor is in the circuit. Gate 0G is connected to the "0" side of the three flip-flops 11A, 225A and 45A. Only when there is a signal on the "0" side for all three values $2^7$, $2^8$ and $2^9$, the switch corresponding to $0_p$ is not closed. This requires an inverter to the gate so that properly speaking, this gate is "nand" gate. Gate 11G is connected to the "1" side of flip-flop 11A and to the "0" side of the flip-flops 225A and 45A. If there is a signal in these three lines the switch $\mathbf{11}_{ps}$ is not closed. In the case of gate 33G, however, two functions must be performed upon receipt of the proper inputs; it must close switch 33S but keep switch $\mathbf{33}_{ps}$ for line $\mathbf{33}_p$ open. For this reason an inverter is required in the circuit to the attenuation resistors but not to the correction resistors.

As seen in Table 4B, gate 45G receives its input from the "0" side of flip-flops 11A and 225A but from the "1" side of flip-flop 45A. Again, this is a "nand" gate. The input signal for gates 56G, 67G and 78G is apparent from Table 4B. Like gate 33G, each of these gates acts on the corresponding correction resistor as an "and" gate without the inverter and on the corresponding attenuation resistor as a "nand" gate, with the inverter.

THE COSINE LOGIC

As shown in FIGURE 11, the same register controls both the sine and cosine networks. The cosine network is exactly the same as the sine network with the addition of one least significant bit which is supplied by a resistor which is always in the network. This will be most apparent from a study of Table 5, which assumes that in the entire network, only the base resistor values are used.

*Table 5*

| Angle Value | Binary Sine Representation | Inverted Binary Sine Representation | Value Added | Binary Cosine Representation |
|---|---|---|---|---|
| 78¾° | 111 | 000 | 001 | 001 |
| 67½° | 110 | 001 | 001 | 010 |
| 56¼° | 101 | 010 | 001 | 011 |
| 45° | 100 | 011 | 001 | 100 |
| 33¾° | 011 | 100 | 001 | 101 |
| 22½° | 010 | 101 | 001 | 110 |
| 11¼° | 001 | 110 | 001 | 111 |

As is readily apparent from the foregoing table, the binary cosine is equal to the inverse of the binary sine plus one bit.

The connection for the sine-cosine networks is illustrated in simple form in FIGURE 13.

Here is shown a portion of sine network 114 and cosine network 115. Only the 45, 225 and 11 branches are shown in the sine network while only the corresponding **45*b*, 225*b* and 11*b* branches are shown in the cosine network. In addition, the cosine network includes one additional 11*b* branch labeled branch 11*b'* which is always in the network. Each branch is actuated by the opposite side of flip-flops 45A, 225A and 11A. When branch 45 is closed, 45A is open, and so forth, for each branch. Therefore, the branches enabled or shunted to the ground in the sine network are exactly the opposite of those so treated in the cosine network. But, the cosine network always includes the one extra bit provided by the branch 11*b***. Although in the crude arrangement of FIGURE 13 some error will be introduced by the arrangement given merely for the purpose of illustration; when this addition is in the least significant bit, the error is virtually non-existant.

From Table 5 it is readily apparent that the binary cosine representation is the inverse of the binary sine representation with the addition of one least significant bit. Therefore, both networks are connected to the same register, the sine network to one side of the flip-flop, the cosine network to the opposite side of the flip-flop. The particular quadrants where the binary values are inverted for both sine and cosine and "1" are added is given in Table 3.

SWITCHES

The switches shown in the schematic representation of the invention appear as mechanical switches. In practice, transistor switches are used and this brings up two problems which must be overcome: leakage and D.-C. shift. As is well known, transistor switches are imperfect and when the switch should be in the short position, there is leakage into the network sufficient to cause error in the output. Instead of using one single resistor in each branch, it has been found that the use of two resistors with the switch in between will reduce error due to saturation impedance considerably. To simplify the network, this then requires a voltage source having theoretically unlimited amperage so that the output amperage is not divided up between the resistors in the network and those shorted to ground. This then permits the use of more than one transistor switch in those branches which require it and permits adjustments without upsetting the entire resistor calculation of the network. Any residual voltage across the first transistor is then shunted to the ground by the second transistor.

The error due to D.-C. shift can be corrected by using the analog switch arrangement of FIGURE 14 which shows the switching arrangement for branch 45. In this switch with the input signal at its low level, near zero volts, the transistor is placed in its conducting state or shorted position by virtue of $-V_b$ bias voltage and the base bias resistor $R_f$. With the control signal at its high state, i.e., positive voltage, the transistor is placed in the enabled or non-conducting state by the input voltage control signal level and resistor $R_g$. In this state, the voltage $V_a$ must be larger in magnitude than the highest positive value of voltage that may appear across the output terminal of the switch. By reversing the polarity of the input control and the bias voltages, NPN transistors can also be used. The requirement of low D.-C. offset voltage which would normally be a very critical requirement in this type of analog switch is not needed in this application since the system is of A.-C. nature. The switch need only have low saturation resistance and low leakage properties. The need for low saturation resistance is relieved by the use of double switches in the most significant bits. In FIGURE 14 representing the 45° branch having a resistor weight of 60K, the resistors have arbitrarily been broken up into 40K, 10K and 10K by the switches.

The power phase reversal switches can be either mechanical or transistor switches but mechanical switches will not cause undue noise in the system. The logic and switching arrangement for the power phase reversal are shown in FIGURE 15.

In the logic are two flip-flops 211L and 210L representing 180° and 90°. From Table 3, it can be seen that for the sine network, a 180° phase reversal occurs when the 180° and 90° flip-flops read "10" or "11." For the cosine, the phase reversal occurs when the same flip-flops read 01 or 10. There are therefore three "and" gates fed by the respective flip-flop sides numbered 10, 11 and 01, each being enabled when receiving a signal corresponding to its part number. The 10 "and" gate leads to the sine "or" gate. The 01 "and" gate leads to the cosine "or" gate. The 11 "and" gate leads to both "or" gates. Each "or" gate leads to a phase reversal switch respectively called the sine phase switch and the cosine phase switch. When the sine "or" gate receives a signal either from the 10 or 11 "and" gates, the sine phase is reversed. When the cosine "or" gate receives a signal either from the 11 or the 01 "and" gate, the cosine phase is reversed.

Going back now to FIGURE 11 the sine and cosine signals are now through the network. The path from here for the sine and cosine signals goes to buffer amplifiers 116 and 117 and to a Scott-T type transformer. An actual Scott-T transformer is not necessary as shown in FIGURE 16. Here the output of the sine network 114 is fed to sine buffer amplifier 116 where it is attenuated by 0.5 and summed with the output of the cosine network attenuated by the 3/2. The resultant outputs from sine buffer amplifier 116 and cosine buffer amplifier 117 are fed to two separate transformer primaries TS–1 and TC–1. These two primaries both feed a center tapped secondary 2. This secondary 2 has the three synchro points *a*, *b*, *c* shown in FIGURE 4. Prior to being fed to the transformers, the output of the sine and cosine networks are the same as the output from a resolver.

It is to be observed therefore that the present invention provides for an arrangement for converting a binary digital input corresponding to an angle into a sinusoidal function of the angle. The digital input is first fed into logic means 112 where the inputs corresponding to 90° and 180° determine the phase of the power supply and the values supplied as the sine and cosine. The logic means 112 control the values and power phase passing through a sine network 114, a cosine network 115 and to a register 113. Base sine and cosine values are supplied by a parallel base resistor network 101 responsive to the register 113. This network has a binary ladder of base parallel resistors to supply base sinusoidal values in response to flip-flop signals from the register corresponding to angles of 11.25°, 22.50°, 45° and 90°. Since for base angular values of 33.75°, 56.25°, 67.50° and 78.75° more than one base resistor will be supplying the sinusoidal value, a correction network 102 is coupled to the base network 101. This correction network also has parallel resistors to be used for the angle values of 33.75°, 56.25°, 67.50° and 78.75° to adjust the sinusoidal value supplied by the base resistors in the network. These correction resistors are enabled into the correction network by a plurality of gating circuits. Responsive to the register 113 is also a fine resistor network 104 also augmented in the binary system to supply fine values between succeeding base values and binary combinations thereof. The values supplied by the fine resistor networks are apportioned between succeeding base resistor values by an attenuation resistor network 103 having a plurality of attenuation resistors determining the slope of the sinusoidal curve. The particular attenuator resistor in the network is determined by a logic arrangement of gating circuits.

The sine and cosine networks are identical except that the cosine has one additional resistor in the fine networks of a value corresponding to the least significant bit in the network. These two networks are enabled by opposite sides of the register flip-flops.

The sine and cosine outputs of both networks are then fed to buffer amplifiers, the output value of which corresponds to the sine and cosine values of the input angle value. To simulate a synchro these sine and cosine values must then be fed to a Scott-T type of transformer device.

While there has been described what at present is believed to be the preferred embodiment of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. An arrangement for converting a binary digital input corresponding to an angle into a sinusoidal function of the angle comprising in combination:

logic means receiving said input, determining the particular quadrant of the angle;

a register coupled to the logic means including a plurality of flip-flops therein which will be separately actuated to their one or other flip-flop position depending on the signal from the logic means;

a parallel base resistor network including a ladder of a plurality of base binary resistors with switch means responsive to said register so as to insert any one or more of said base resistors into the network so as to supply base sinusoidal values in response to flip-flop signals from the register;

a correction network responsive to said base resistor network output, said correction network including a plurality of parallel correction resistors and a plurality of gating circuits controlling which of said correction resistors is in the network in response to inputs from said register, said correction resistors adjusting the sinusoidal value supplied to the true value when more than one base resistor is in the network;

a fine resistor network having a ladder of fine binary parallel resistors with switch means responsive to said register so as to insert any one or more of said fine resistors into the network so as to supply fine values between succeeding base values and binary combinations thereof;

an attenuation resistor network connected to said base and fine resistor networks to apportion the fine values supplied by the fine resistors between the values supplied by succeeding base resistors and binary combinations thereof and a plurality of gating circuits connected between said register and said attenuation resistor network controlling which of said attenuation resistors is in the network in response to inputs from said register; and, switch means responsive to said logic means to feed in A.-C. power in proper phase to said networks depending on the quadrant of the angle, the phase of the power supplied to the correction network being 180° out of phase with that supplied to the rest of the network.

2. An arrangement as claimed in claim 1, said resistors of the base and fine networks each having a binary digital ladder value with respect to the other resistors in its network and being enabled into the network by a signal from one side of a flip-flop in response to a corresponding digital binary input, the output of the entire network corresponding to the sine of the angle.

3. An arrangement as claimed in claim 2, said resistors of said base network having values which will supply a current proportional to the sine values of 11¼°, 22½°, 45° and 90°, said resistors of the correction network having values which will pass current which when dedeucted from the binary combination of resistors in the base network will provide values proportional to the sine of 33¾°, 56¼°, 67½° and 78¾°, the resistors in said fine resistor network providing a plurality of fine values of 5⅝° and less, said resistors in the attenuation network apportioning said fine values between the sine values provided by the base and correction networks.

4. An arrangement as claimed in claim 2, including a second group of resistor networks, the resistors of the base network thereof each having a binary digital ladder value with respect to the other resistors in its network, the resistors of the fine network thereof less one each having a binary digital ladder value with respect to the other resistors of its network, said base and fine resistors less said one being enabled by a signal from the other side of said flip-flop in response to the absence of a corresponding binary input, said one resistor having a value corresponding to the resistor weighted to represent the least significant bit of the fine networks and being always in the network.

5. An arrangement as claimed in claim 4, including a three wire output transformer circuit, the outputs of said first and second resistor networks being fed in quadrature to said three wire output transformer circuit, the output therefrom being the sine value of the binary digital input, the sine value of 120° plus said digital input and the sine of 120° less than said digital input.

6. An arrangement as claimed in claim 4, including an "and" gate corresponding to 90°, the inputs thereto being all the base and fine resistors in the network, one extra bit and reversing means in the register responsive to said 90° "and" gate, said reversing means and one bit reversing the signal corresponding to the input value and adding the one bit for all digital input values over 90°.

7. An arrangement as claimed in claim 6, including first switch means controlling the power fed to the base, attenuation and fine resistor networks; second switch means controlling the power fed to said correction resistor networks; switch control means in the logic means controlling said first and second switch means.

8. A device as claimed in claim 7, including switch control means and invert and add one bit means in said logic means, said switch control means and invert and add one bit means acting in accordance with the following table:

*Table*

| Input Angle Value in Degrees | Most Significant Bit Input | Second Most Significant Bit Input | Sine Network | | Cosine Network | |
|---|---|---|---|---|---|---|
| | | | Input Power Polarity Normal or 180° Phase Reversal | Invert and Add One | Input Power Polarity Normal or 180° Phase Reversal | Invert and Add One |
| 0–90 | None | None | Normal | No | Normal | No. |
| 90–180 | do | Yes | do | Yes | Reverse | Yes. |
| 180–270 | Yes | None | Reverse | No | do | No. |
| 270–360 | Yes | Yes | do | Yes | Normal | Yes. |

No references cited.

MAYNARD R. WILBUR, *Primary Examiner.*

DARYL W. COOK, MALCOLM A. MORRISON, *Examiners.*

W. J. KOPACZ, *Assistant Examiner.*